US009063855B2

(12) United States Patent
McNairy et al.

(10) Patent No.: US 9,063,855 B2
(45) Date of Patent: Jun. 23, 2015

(54) FAULT HANDLING AT A TRANSACTION LEVEL BY EMPLOYING A TOKEN AND A SOURCE-TO-DESTINATION PARADIGM IN A PROCESSOR-BASED SYSTEM

(71) Applicants: Cameron B. McNairy, Windsor, CO (US); Anil Agrawal, Santa Clara, CA (US); Jenna S. Mayfield, Fort Collins, CO (US); Eric A. Gouldey, Fort Collins, CO (US); Mark Millican, Fort Collins, CO (US)

(72) Inventors: Cameron B. McNairy, Windsor, CO (US); Anil Agrawal, Santa Clara, CA (US); Jenna S. Mayfield, Fort Collins, CO (US); Eric A. Gouldey, Fort Collins, CO (US); Mark Millican, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 13/826,843

(22) Filed: Mar. 14, 2013

(65) Prior Publication Data
US 2014/0281747 A1 Sep. 18, 2014

(51) Int. Cl.
*G06F 11/00* (2006.01)
*G06F 11/07* (2006.01)
*G06F 11/10* (2006.01)

(52) U.S. Cl.
CPC ............ *G06F 11/0784* (2013.01); *G06F 11/00* (2013.01); *G06F 11/10* (2013.01); *G06F 11/1008* (2013.01); *G06F 11/1024* (2013.01); *G06F 11/0724* (2013.01)

(58) Field of Classification Search
CPC ..... G06F 11/00; G06F 11/10; G06F 11/1008; G06F 11/1024
See application file for complete search history.

(56) References Cited

U.S. PATENT DOCUMENTS

| 5,953,351 | A * | 9/1999 | Hicks et al. ................... 714/763 |
| 6,519,736 | B1 * | 2/2003 | Chen et al. .................... 714/768 |
| 8,812,898 | B1 * | 8/2014 | Lahon et al. ................... 714/4.2 |
| 2005/0015664 | A1 * | 1/2005 | Johnson et al. ................. 714/15 |
| 2008/0022154 | A1 * | 1/2008 | Endou ............................ 714/30 |

* cited by examiner

*Primary Examiner* — Charles Ehne
(74) *Attorney, Agent, or Firm* — Lowenstein Sandler LLP

(57) ABSTRACT

A method for detecting errors in a processing device is disclosed. A data source unit of a processing device transmits data and a qualifier synchronously with the data, the qualifier to indicate the data is uncorrectable. At least one intermediate functional unit in the processing device receives the data and the qualifier. The at least one intermediate functional unit detects the data is uncorrectable based on the qualifier. The at least one intermediate functional unit transmits, without using, the data and the qualifier synchronously with the data to a data consumer unit of the processing device. The data consumer unit receives the data and the qualifier. The data consumer unit detects the data is uncorrectable based on the qualifier. The data consumer unit maintains, without using the data and the qualifier.

25 Claims, 8 Drawing Sheets

FAULT HANDLING AT A TRANSACTION LEVEL BY EMPLOYING A TOKEN AND A SOURCE-TO-DESTINATION PARADIGM IN A PROCESSOR-BASED SYSTEM

TECHNICAL FIELD

The embodiments of the disclosure relate generally to computer processor devices and, more specifically, to handling uncorrectable hardware errors between functional elements of a processing device using a method of synchronous data qualification.

BACKGROUND

Computer processors may employ error correction hardware to correct errors of various corruption length and properties. Some error conditions exceed the ability of an error correction scheme to correct. In another example, data may become lost or otherwise unavailable for further processing. It is the error processing capabilities and architecture of a computer processor that determines when and how to handle uncorrectable errors, unavailable data errors, and other hardware-based errors within and between functional elements of the computer processor. The error processing architecture is an infrastructure distributed among each of the functional blocks of the computer processor with varying error detection and processing capabilities.

In one example, an error processing architecture may employ an asynchronous message channel path for uncorrected error signaling. The corrupt data is used by the requesting execution unit(s) with the expectation that an error message is delivered early enough to prevent any corruption of the architectural state and subsequent functional elements due to receiving corrupted data. However, since the error message is delivered asynchronously, there is a time-window where thread(s) may continue to execute instructions, which may lead to potential data corruption. The time-window may be small, but it is not zero.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
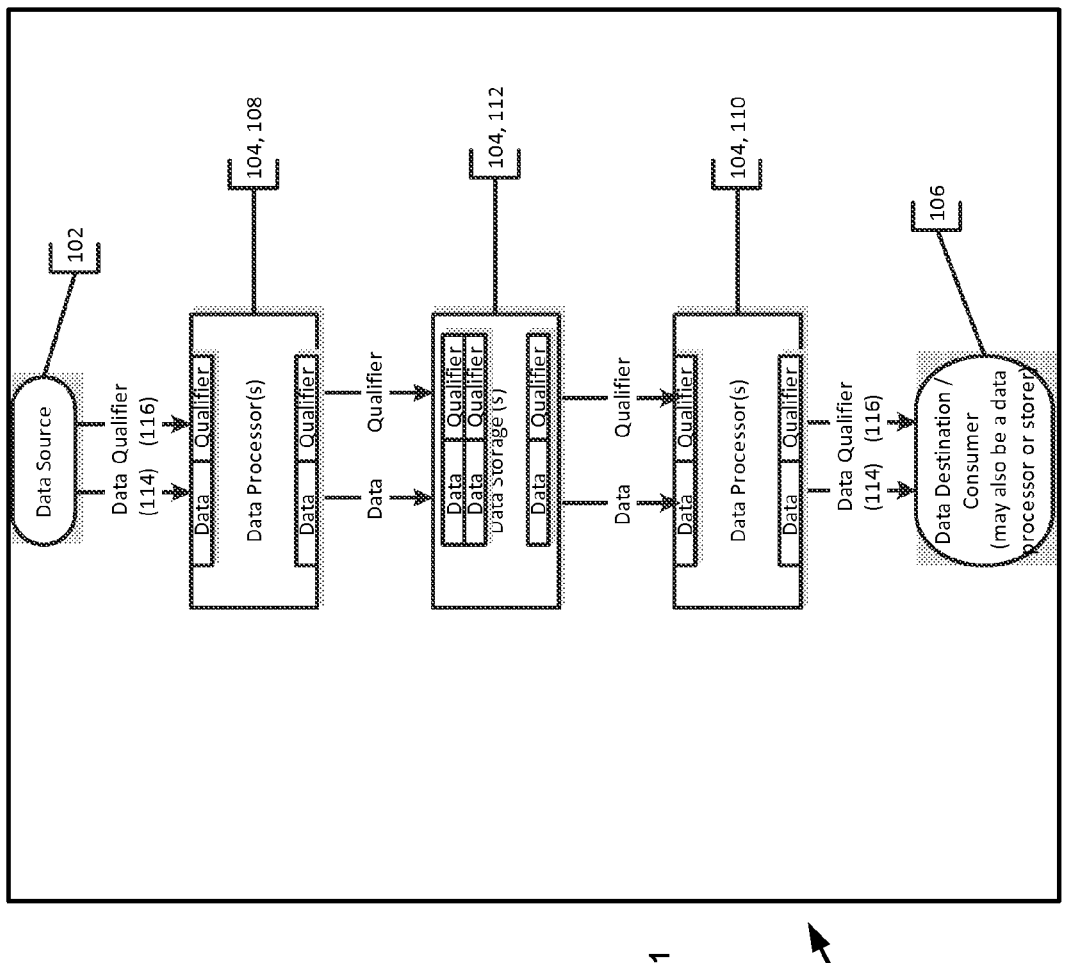
FIG. 1 is a block diagram that illustrates an example processing device in which examples of the present disclosure may operate.

Conventionally, an error processing architecture may employ an asynchronous message channel path for handling uncorrectable errors. In an example, a load command may be issued by one thread of a multi-core/multi-hardware threaded processing device. A memory controller reads program code for the load command from a memory. When the program code for the load command is read by a memory controller, the memory controller detects an un-correctable multi-bit error fault.

The memory controller returns program control to an execution engine with an uncorrected data. The memory controller updates error logs and transmits an uncorrected data error indication to a message handler. The message handler broadcasts the uncorrected data error indication to all running cores/threads along an asynchronous interrupt messaging channel to halt execution of the other threads and to contain the propagation of errors on other cores/threads. The issuing thread generates a precise exception and control flow is redirected to error processing code.

Unfortunately, there is a delay or time window between the detection of the uncorrected data error and branching to fault handling code. During the time window, other threads of the same and other cores may continue to execute instructions using data containing the uncorrected error, leading to a downstream propagation of errors.

On the initiating thread, further execution is halted and branches to exception handling code of an exception handler. During execution of the exception handling code, the exception handler may capture an error log. Upon resuming from the exception handler, execution branches to an OS-based exception handler, which reads the log, clears the exception in the log, and resets the processing device.

In another example, conventionally, a processing device may employ an error processing architecture that uses data qualification for handling uncorrectable errors. In the context of processing devices, data qualification refers to a method for tagging specific data as uncorrectable in a source functional element which is further used to indicate to downstream functional elements not to act upon the uncorrectable data. Whether and how the data is to be tagged as uncorrectable data is highly machine architecture specific.

In one example, a single bit 'poison' indicator may be attached to data as it travels from memory/caches/IIO to a core. When an intermediate device function block (e.g., a core cache) receives, for example, instruction data with this poison indication, the instruction is not permitted to continue execution through other functional blocks. Instead, a special code sequence is executed in which a unique error signature is logged in a logging register, and an error indication is signaled to other downstream functional blocks/threads/processor cores.

For example, a load command may be issued by one thread of a multi-core/multi-hardware threaded processing device. A memory controller reads program code for the load command from a memory. When the program code for the load command is read by the memory controller, the memory controller detects an un-correctable multi-bit error fault.

The memory controller may return program control to a cache (i.e., an intermediate functional block) with uncorrected data and with a data poison bit set. The memory controller also updates error logs indicating the detection of uncorrected data and sends a low priority message to a message handler. This time, the processing device notices the instruction data with the poison indication, and the instruction is not permitted to continue execution though other functional blocks if the issuing thread. Instead, a special code sequence is executed by the issuing thread which logs a unique error signature in an error logging register. However, the poisoned data is left in the intermediate functional blocks (not shown) without further containment.

This method eliminates the potential of data corruption by the thread that initiates the load instruction. However, the signaling path of the uncorrected remains the same, wherein, to contain the propagation of errors on other cores/threads, the uncorrected data error is broadcast along an asynchronous interrupt messaging channel to interrupt execution of the other threads within the socket and to other sockets within the cache-coherent domain.

Initially, program execution of the initiating thread is halted and branches to error processing code of an exception handler. During execution of the exception handling code, the exception handler may capture an error log. Upon resuming from the exception handler, execution branches to an OS-based exception handler, which reads the error log and detects that exception was triggered due to poison data. This permits the OS-based exception handler to make an attempt to recover the system for certain error types and return to normal execution by potentially loading a new program. In circumstances where the OS-based exception handler is unable to recover the system, it resets the processing device.

Unfortunately, there is still a non-zero delay or time window (not shown) between the detection of poison data and asynchronously signaling to other cores/threads. The asynchronous signaling path on which the error indication is transmitted permits other thread(s) to operate on the poison data and data corruption may still occur. As a result, a 'double fault' may be indicated. For such unrecoverable exceptions, the processing device immediately enters into shutdown mode. Additionally, since there is only a single error indication bit (i.e., the poison), there is no identification of the source of the poisoned data. Without an indication of the source, system firmware needs to rely on bread-crumbs in the error log registers of the many units that may have touched the data. High performance systems are highly concurrent. Therefore, there may be multiple data requests outstanding and the error logs for the poisoned data may be overwritten by other errors—both related and un-related. Also, without details about source of the poison, it is impossible for receiving execution units to choose an optimal response to received error data.

Embodiments of the disclosure address the above deficiency of conventional solutions by a data source unit in a processing device transmitting data and a qualifier synchronously with the data, the qualifier to indicate the data is uncorrectable. At least one intermediate functional unit in the processing device receives the data and the qualifier. The at least one intermediate functional unit detects the data is uncorrectable based on the qualifier. The at least one intermediate functional unit transmits, without using, the data and the qualifier synchronously with the data to a data consumer unit of the processing device. The data consumer unit receives the data and the qualifier. The data consumer unit detects the data is uncorrectable based on the qualifier. The data consumer unit maintains, without using, the data and the qualifier.

In one embodiment, the qualifier is stored in a field associated with the data. The qualifier may indicate the data source as a source of error of the data. The qualifier may indicate a type of error in the data. The type of error in the data may be an uncorrectable or incomplete error. In one embodiment, at least one of the data source unit, the data consumer unit, and the at least one intermediate functional unit is one of a data storage element or a data processing element. The data storage element or the data processing element is one of a processor core, an input-output element, a memory, a cache or an inter-processor interconnect element.

By maintaining but not using the uncorrectable data and the data qualifier, error correction mechanisms may initiate a synchronous control flow change to error processing code. In one embodiment of an error processing mechanism, the data consumer unit may be a register file when the data comprises operand data for an execution unit or when the data comprises instructions. When the data is operand data, the register file continuously replays the data and the qualifier until an associated instruction stream is re-steered to error processing code to prevent using the data and to ensure synchronous error reporting. When the data comprises instructions, the execution unit detects an error based on the qualifier, continuously replays the data and the qualifier to prevent corrupt instructions from executing, re-steers the instructions to error processing code, and retires an associated instruction stream. In either case, after executing the error processing code, the processing device may resume program execution without resetting the entire processing device. Reliability, availability, and serviceability of the processing device are thus enhanced.

FIG. 1 is a block diagram that illustrates an example processing device 100 in which examples of the present disclosure may operate. The processing device 100 includes a data source unit 102, at least one intermediate functional unit 104, and a data consumer unit 106. The data source unit 102 may be, for example, a data storage device, such as a data cache or main system memory. The at least one intermediate functional unit 104 may be one or more of data processing units (e.g., 108, 110) and/or data storage units (e.g., 112). The data consumer unit 106 may be a data processing or data storage unit. The data source unit 102, the at least one intermediate functional unit 104, and the data consumer unit 106 may be a processor core, input-output, memory, cache, or inter-processor interconnects related blocks.

The processing device 100 employs synchronous error signaling, where the data source unit 102 may detect that the data 114 it is storing or processing has an uncorrectable fault or that the data is incomplete, and is therefore poisoned data. The data source 102 may store a poison data qualifier 116 in a field (e.g., an ECC, parity, or other field) associated with the corrupted data such that the data and the poison indication travel through downstream devices together synchronously.

The intermediate functional units 108, 110, 112 that may store and later forward the data 114 also may store the uncorrectable or data qualifier 116, i.e., maintain the data qualifier 116 synchronously with the data 114. The data qualifier 116 may expand beyond an initial data segment to a natural error detection granularity of each functional unit storing the data 114 (e.g., a cache with error protection on a byte width basis may indicate an uncorrectable error within that byte, but a cache higher in the hierarchy with an error protection on a cache line basis may mark the entire line poisoned instead of just the original byte). The data qualifier 116 may alias to natural error conditions such as parity error or as multi-bit data error conditions for ECC protected blocks.

The data consumer unit 106 may detect that the data 114 is uncorrectable based on the data qualifier 116. The data qualifier 116 may indicate the data source unit 102 as a generator of the uncorrectable data 114. The data qualifier 116 may indicate a type of error in the data 114 which may be, for example, an uncorrectable data error such as a multi-bit data error or parity error. The data consumer 106 is not to consume the uncorrectable data 114 but maintain the data 114 and the data qualifier 116 based on detecting the data 114 is uncorrectable. Mechanisms in the error detection and recovery hardware ensure that consuming instructions do not actually use the uncorrectable data 114.

In an example, the final receiving block (e.g., the data consumer unit 106) may be a register file for operand data or an execution unit for instruction data. The data qualifier 116 is stored with the delivered data 114 by the data consumer unit 106. In an example, storing the data qualifier 116 with the uncorrectable data 114 may be accomplished by a synchronous replay mechanism for both data and instructions. For data, this mechanism may continuously replay until the instruction stream is re-steered. For data, this mechanism may immediately and synchronously redirect control flow to error processing code as an exception. For instructions, this mechanism maintains the data qualifier 116 until execution units detect the error and employ the replay mechanism to prevent the corrupt instructions from executing and retiring. In an example, the data source unit 102, as a result of detecting the uncorrectable data 114, may signal a low severity error indication to error detection and recording logic (not shown). The at least one intermediate logic unit 104, as a result of detecting the uncorrectable data, may signal or log a low severity error indication in response to detecting the data 114 is poisoned. The data consumer unit 106, as a result of detecting the poison data 114, may signal or log a high severity error indication since it is the requester of the data and intended to use the data as operand or instruction.

Figure 2:
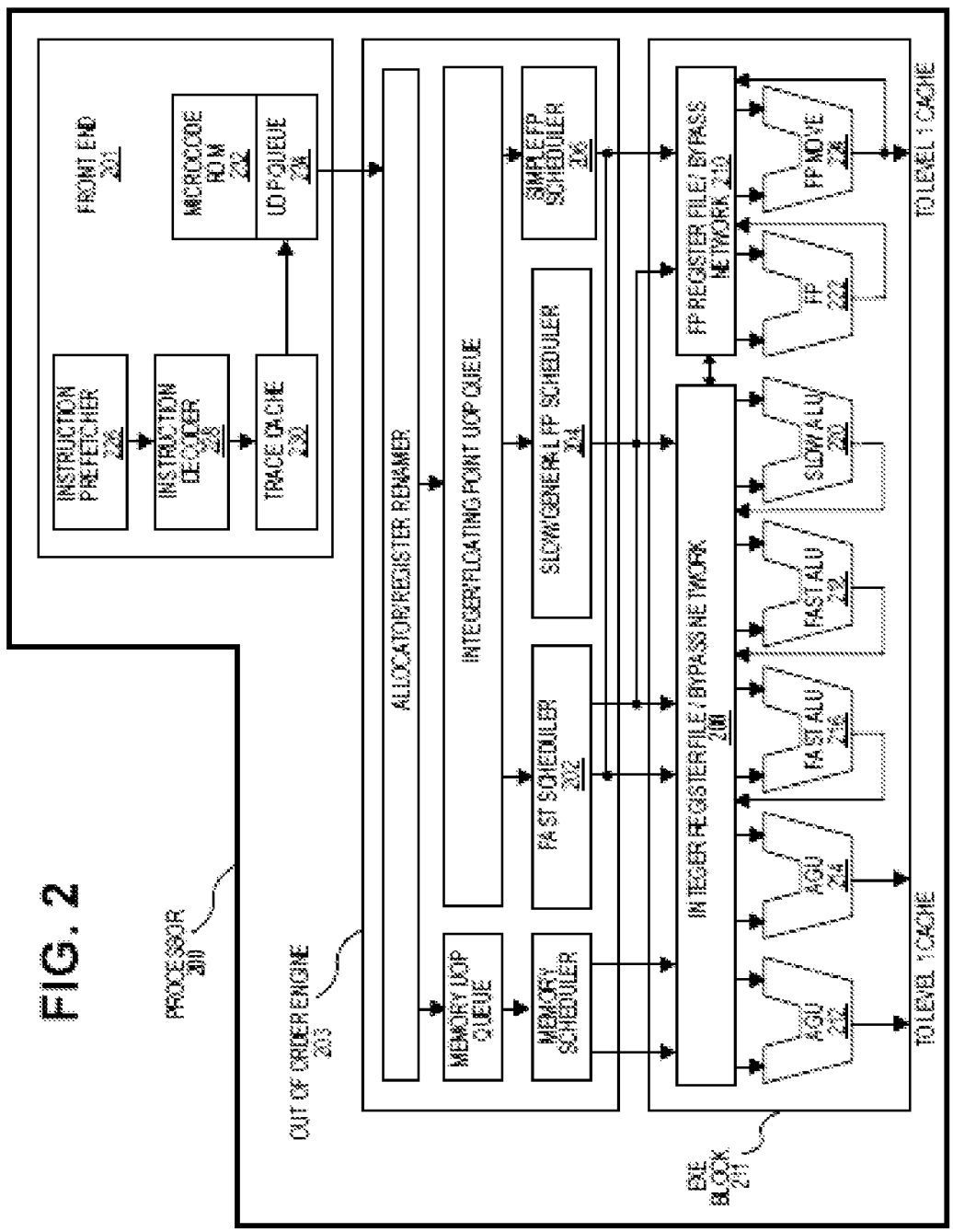
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
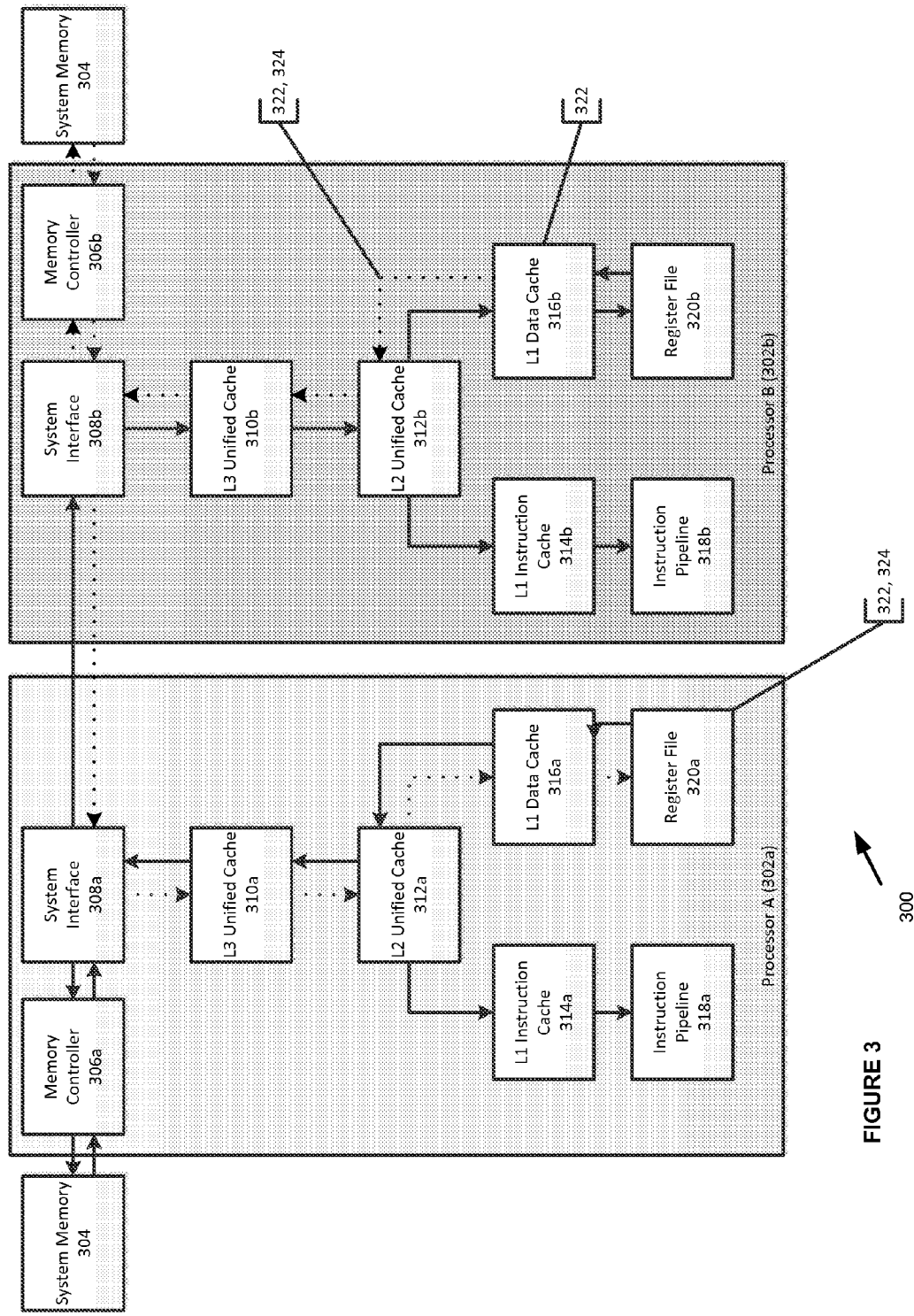
FIG. 3 is a block diagram that illustrates an example processing device in which examples of the present disclosure may operate.

FIG. 3 is a block diagram that illustrates an example processing device 200 in which examples of the present disclosure may operate. The processing device 300 includes a plurality of processors (e.g., processor A (302a) and processor B (302b)), each of which may interface with external system memory 304. Each of the plurality of processors 302a, 302b may comprise a corresponding plurality of functional blocks, which may comprise, for example, a memory controller 306a, 306b coupled to the external system memory 304. The memory controllers 306a, 306b are further coupled to corresponding system interface units 308a, 308b, which permit communication between the processors 302a, 302b. The system interface units 308a, 308n are further coupled to corresponding level 3 (L3) unified caches 310a, 310b. The level 3 unified caches 310a, 310b are coupled to corresponding level 2 (L2) unified caches 312a, 312b. The level 2 unified caches 312a, 312b are coupled to corresponding separate level 1 (L1) instruction caches 314a, 314b and corresponding level 1 (L1) data caches 316a, 316b. The level 1 instruction caches 314a, 314b are coupled to corresponding instruction pipelines 318a, 318b. The level 1 data caches 316a, 316b are coupled to corresponding register files 320a, 320b.

In an example, an uncorrectable error may develop while data 322 is stored in the L1 data cache 316b (i.e., the data source unit 102). The data 322 may be evicted (by explicit or implicit write-back) and a data qualifier 324 may indicate the data 322 is uncorrectable. Error detection and recording logic records a low severity error for this event. The data 322 and the data qualifier 324 may be transmitted by the L1 data cache 316a to and through a plurality of intermediate functional units 104 from processor B (302B) to processor A (302A) by means of the corresponding system interface units 308b, 308a. Each of the intermediate functional units 104 maintain and pass the uncorrectable data 322 and the data qualifier 324 from one structure to another. Error detection and recording logic records a low severity error. The destination of the data 322 and its data qualifier 324 is the register file 320a, which receives the data qualifier 116 but does not consume the uncorrectable data 322, and where error detection and recording logic record a higher severity error.

Figure 4:
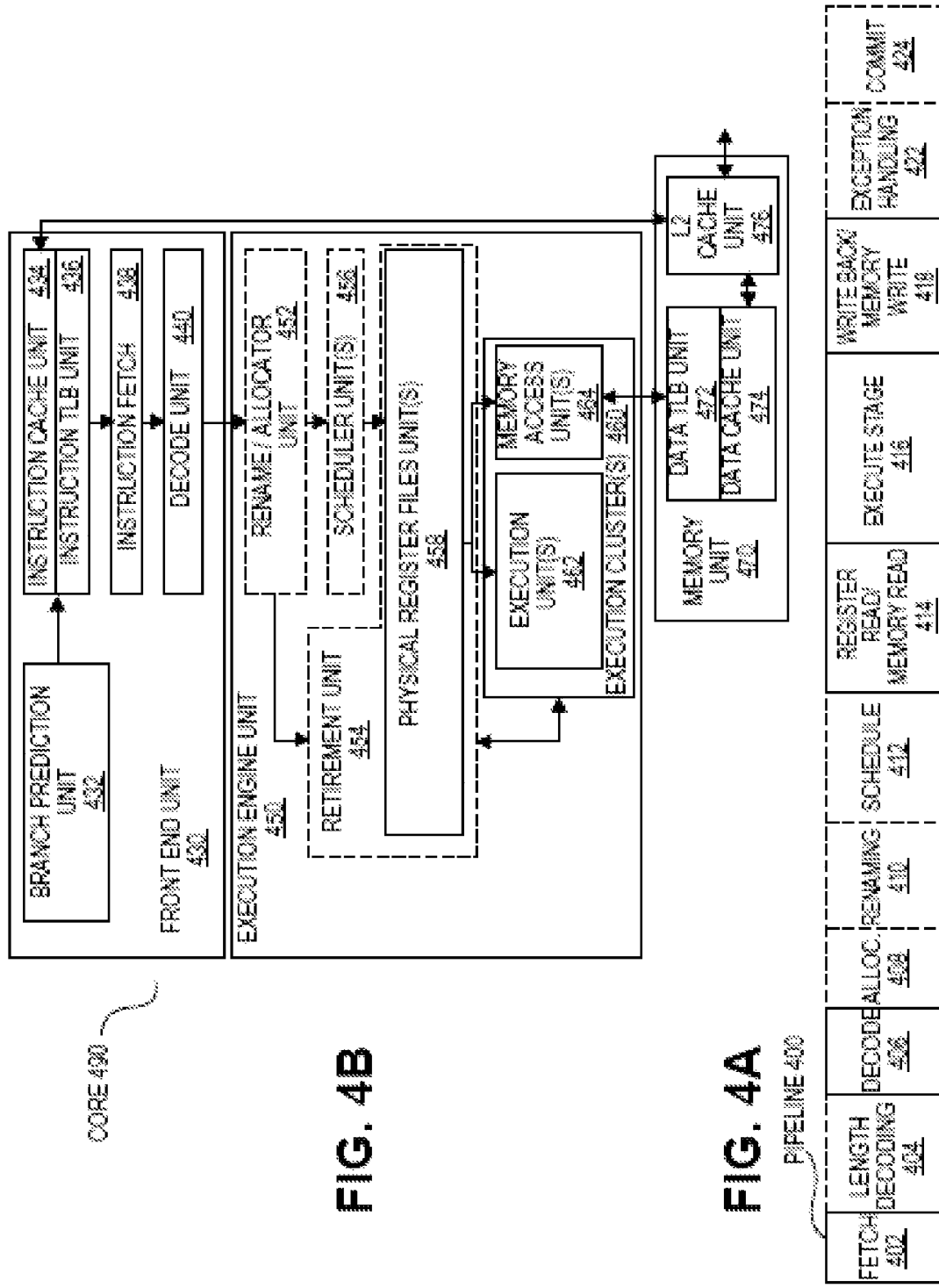
FIG. 4A illustrates elements of a processor micro-architecture according to one embodiment.
FIG. 4B illustrates elements of a processor micro-architecture according to one embodiment.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
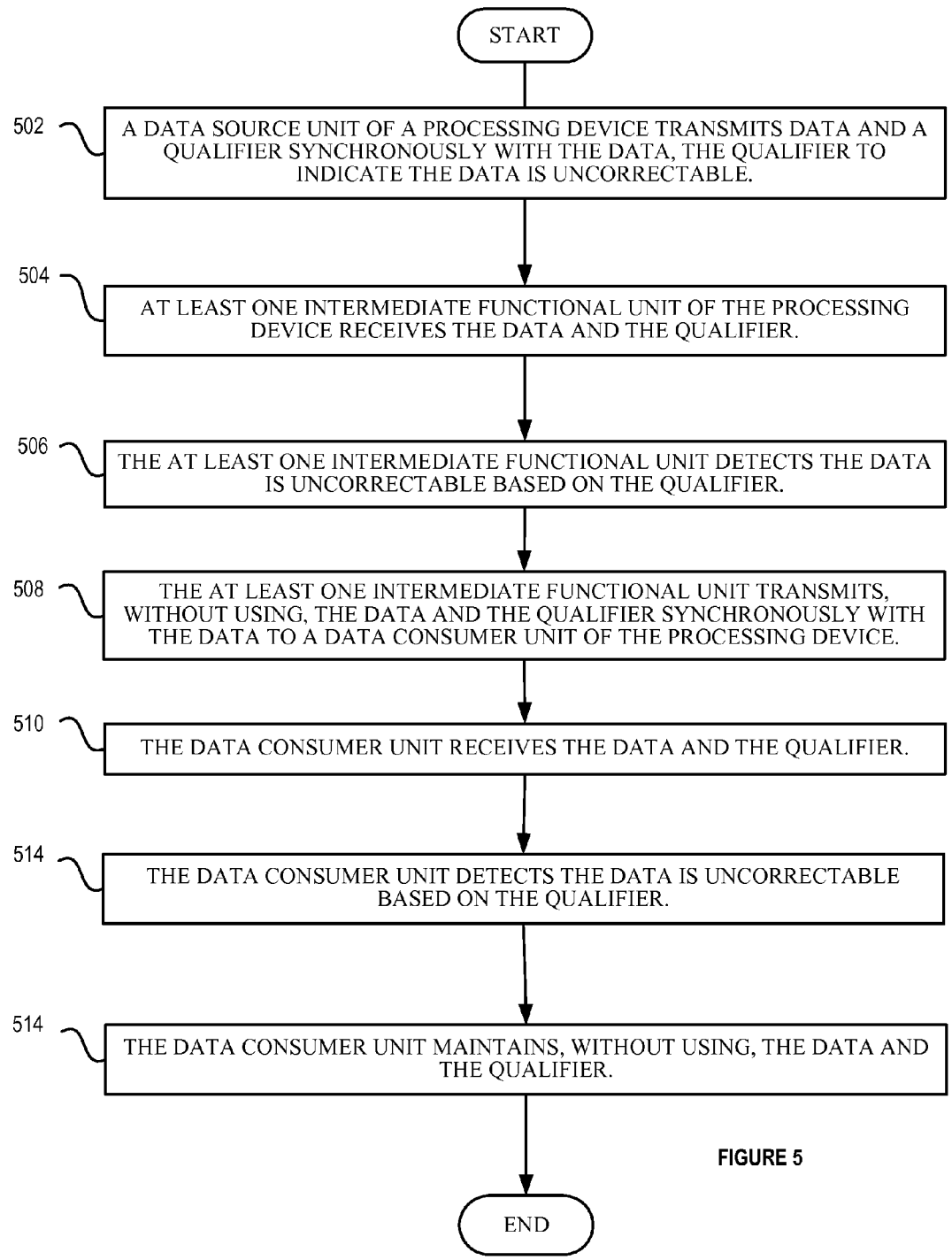
FIG. 5 is a flow diagram illustrating an example of a method for detecting errors in a processing device.

FIG. 5 is a flow diagram illustrating an example of a method 500 for detecting errors in a processing device. At block 502, a data source unit 102 of the processing device 100 transmits data 114 and a qualifier 116 synchronously with the data 114, the qualifier 116 to indicate the data 114 is uncorrectable. The qualifier 116 may be stored in a field associated with the data 114. The qualifier 116 may indicate the data source unit 102 as a source of uncorrectable corruption of the data 114. The qualifier 116 may indicate a type of error in the data 114. The type of error in the data 114 may be, for example, an uncorrectable or incomplete error. The type of uncorrectable error may be, for example, a multi-bit error or a parity error. The data source unit 102, upon detecting the data 114 is uncorrectable may signal a low severity error indication.

At block 504, at least one intermediate functional unit 104 of the processing device 100 receives the data 114 and the qualifier 116. At block 506, the at least one intermediate functional unit 104 detects the data 114 is uncorrectable based on the qualifier 116. The at least one intermediate functional unit 104, upon detecting the data 114 is uncorrectable, may signal and/or log a low severity error indication. At block 508, the at least one intermediate functional unit 104 transmits, without using, the data 114 and the qualifier 116 synchronously with the data to a data consumer unit 106 of the processing device 100.

At block 510, the data consumer unit 106 receives the data 114 and the qualifier 116. At block 512, the data consumer unit 106 detects the data 114 is uncorrectable based on the qualifier 116. At block 514, the data consumer unit 106 maintains, without using, the data 114 and the qualifier 116. The data consumer unit 106, upon detecting the data 114 is uncorrectable, may signal and/or log a high severity error indication.

Figure 6:
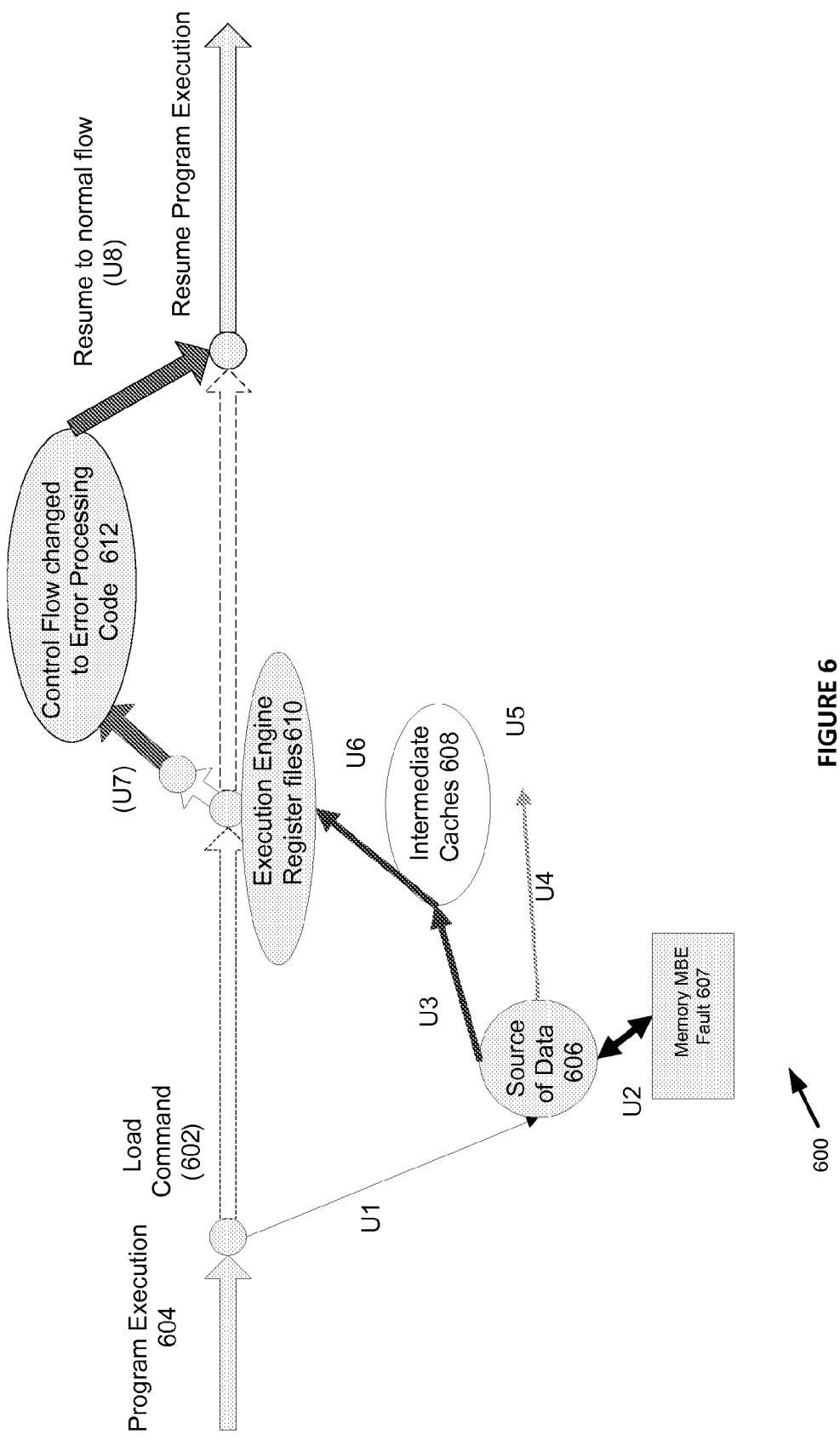
FIG. 6 is a block diagram of a sequence of messages passed between functional blocks of a processing device that employs one embodiment of synchronous data poisoning for handling uncorrectable errors.

FIG. 6 is a block diagram of a sequence of messages passed between functional blocks of a processing device 600 that employs one embodiment of synchronous data poisoning for handling uncorrectable errors. Program code indicates that a load command 602 is to be executed which is running on thread0/core0 (604) of the processing device 600. At block U1, a data source unit 606, which, in an example, is a memory controller 606, retrieves data corresponding to the load command from a memory (not shown). At block U2, the memory controller 606 detects an uncorrected error 607. At block U3, the memory controller 606 transmits the data synchronously with a qualifier indicating that data is uncorrectable to intermediate caches 608. At block U4, the memory controller 606 updates error logs and may, at block U5, signal a low severity error event. At block U6, the intermediate caches 608 recognize the data is poisoned by detecting the data qualifier, and transmits the data and the data qualifier synchronously to a data consumer unit 610, which, in the example, is an execution engine 610 of thread0/core0 (604) while traveling through intermediate caches 608. The execution engine 610 logs the error in a corresponding register file but does not consume the corrupted data upon detecting the poison data qualifier. At block U7, program control branches to error processing code 612. At block U8, program control resumes on thread0/core0 (604) to normal execution.

Figure 7:
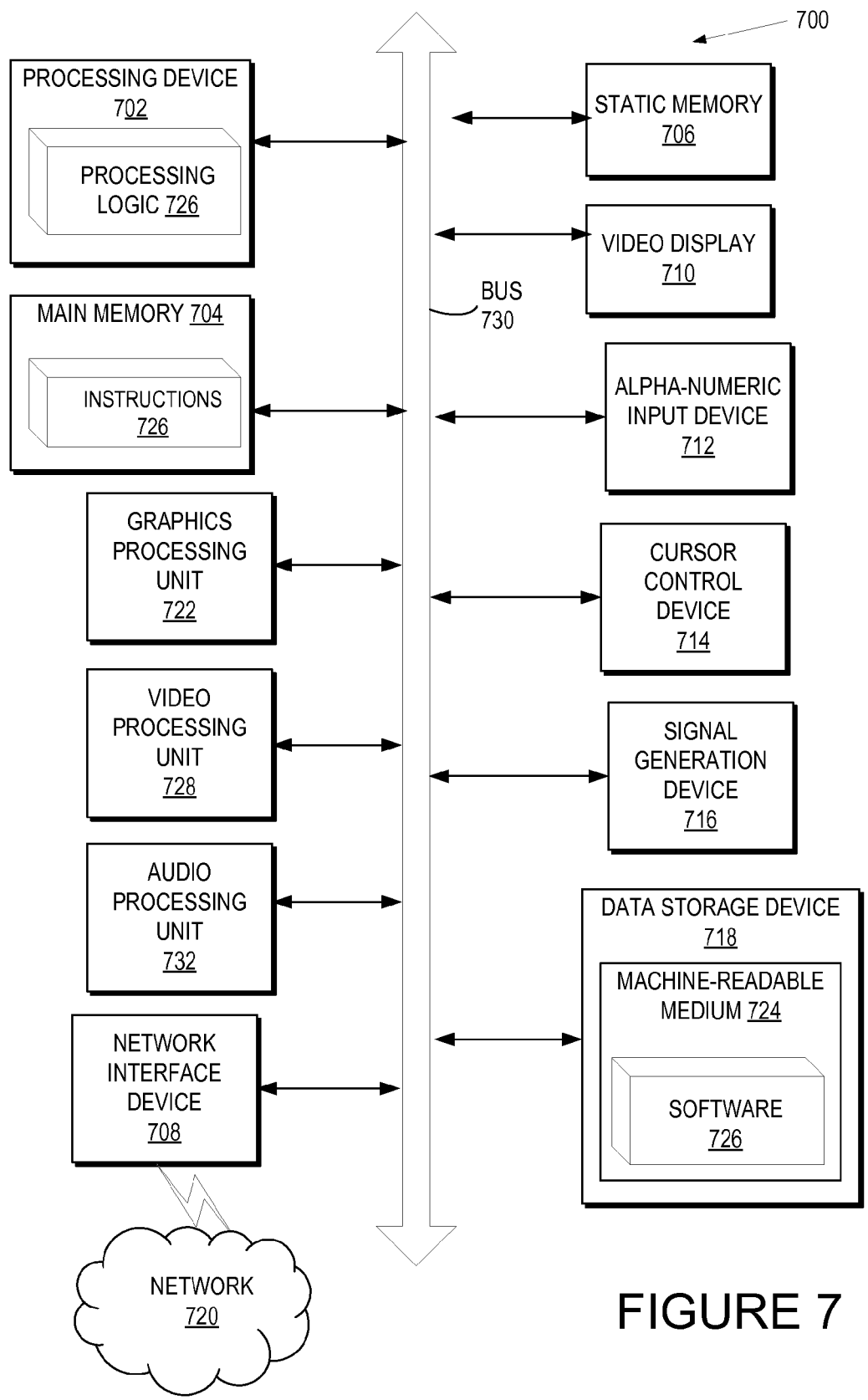
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the example form of a computing system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 700 includes a processing device 702, a main memory 804 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or processing cores. The processing device 702 is configured to execute the processing logic 726 for performing the operations discussed herein. In one embodiment, processing device 702 is the same as processing device 100 described with respect to FIG. 1 that implements the data source unit 102, at least one intermediate function units 104, and the data consumer unit 106. Alternatively, the computing system 700 can include other components as described herein.

The computing system 700 may further include a network interface device 708 communicably coupled to a network 720. The computing system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), or other peripheral devices. Furthermore, computing system 700 may include a graphics processing unit 722, a video processing unit 728 and an audio processing unit 732. In another embodiment, the computing system 700 may include a chipset (not illustrated), which refers to a group of integrated circuits, or chips, that are designed to work with the processing device 702 and controls communications between the processing device 702 and external devices. For example, the chipset may be a set of chips on a motherboard that links the processing device 702 to very high-speed devices, such as main memory 704 and graphic controllers, as well as linking the processing device 702 to lower-speed peripheral buses of peripherals, such as USB, PCI or ISA buses.

The data storage device 718 may include a computer-readable storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computing system 700; the main memory 704 and the processing device 702 also constituting computer-readable storage media.

The computer-readable storage medium 724 may also be used to store instructions 726 utilizing the data source unit 102, at least one intermediate function units 104, and the data consumer unit 106, such as described with respect to FIG. 1, and/or a software library containing methods that call the above applications. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 8:
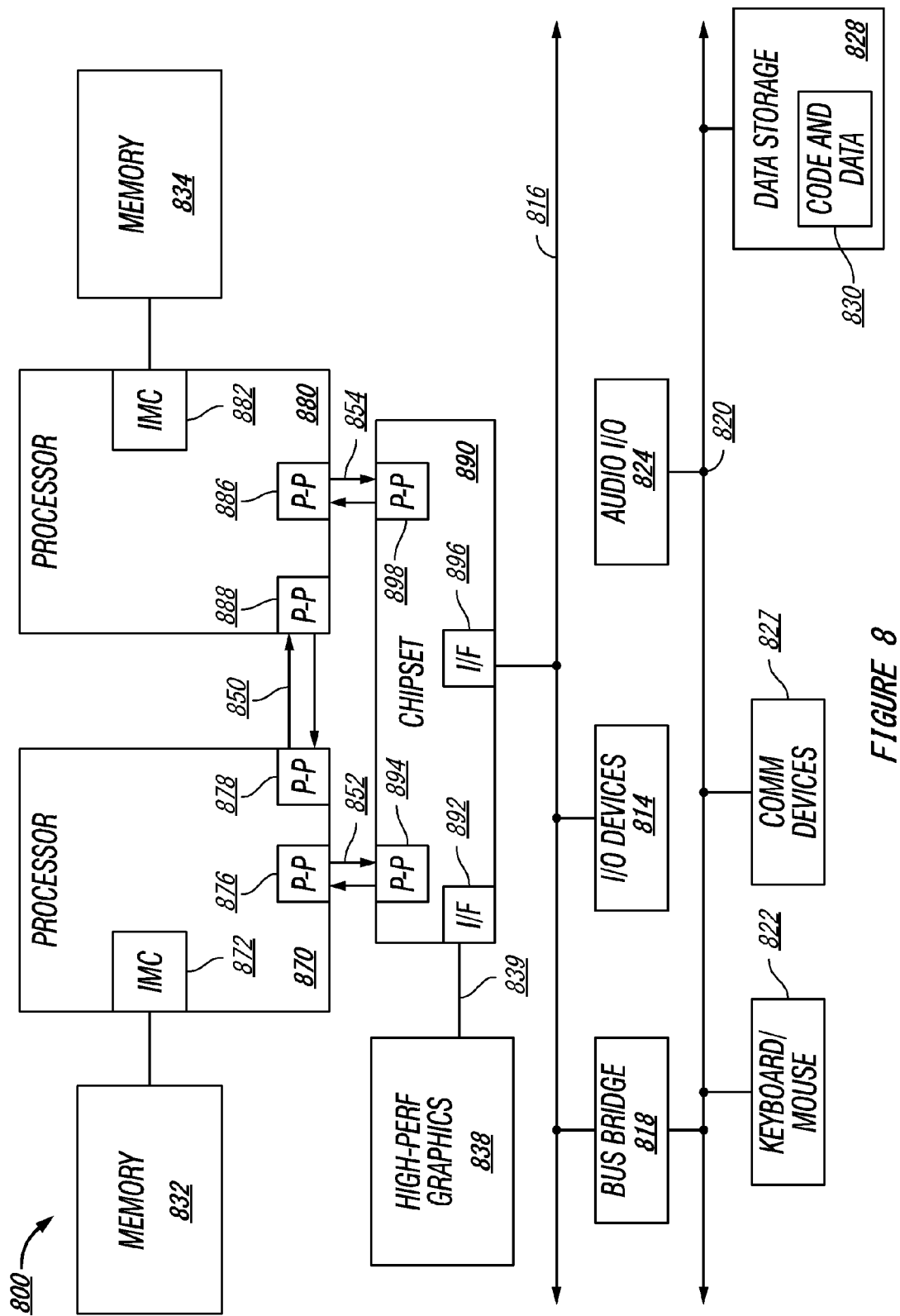
FIG. 8 is a block diagram of a computer system according to one embodiment.

Referring now to FIG. 8, shown is a block diagram of a second system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processors of the computing systems as described herein.

While shown with two processors 870, 880, it is to be understood that the scope of the present disclosure is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

The following examples pertain to further embodiments.

Example 1 is an method comprising: 1) transmitting, by a data source unit in the processing device, data and a qualifier synchronously with the data, the qualifier to indicate the data is uncorrectable; 2) receiving the data and the qualifier by a data consumer unit in the processing device; 3) detecting, by the data consumer unit, the data is uncorrectable based on the qualifier; and 4) maintaining, without using, by the data consumer unit, the data and the qualifier.

In Example 2, the subject matter of Example 1, he qualifier can optionally be stored in a field associated with the data.

In Example 3, the subject matter of any of Examples 2-3 the qualifier can optionally indicate the data source unit as a source of error for the data.

In Example 4, in the subject matter of any of Examples 1-3, the qualifier can optionally indicate a type of error in the data.

In Example 5, in the subject matter of any of Examples 1-4, the type of error in the data can optionally be uncorrectable or incomplete.

In Example 6, in the subject matter of any of Examples 1-5, the type of uncorrectable error can be a multi-bit error or parity error.

In Example 7, in the subject matter of any of Examples 1-6, the preventing use of the data and the qualifier can optionally comprise aborting delivery of the data.

In Example 8, in the subject matter of any of Examples 1-7, the data consumer unit can be a register file or functional unit when the data comprises operand data or an execution unit when the data comprises instructions.

In Example 9, in the subject matter of any of Examples 1-8, the use of the data can optionally be prevented until the instruction stream is re-steered to error processing code an when the data comprises instructions, the execution unit can optionally: 1) detect an error based on the qualifier, 2) prevent the uncorrectable instruction data from executing, 3 re-steer the instructions to error processing code, and 4) retire an associated instruction stream.

In Example 10, the subject matter of any of Examples 1-9 can optionally process, by the processing device, the re-steered instruction stream with the error processing code.

In Example 11, subject matter of any of Examples 1-10 can optionally, after processing the error processing code, resume program execution by the processing device.

In Example 12, the subject matter of any of Examples 1-11 can optionally detect, by the data source unit, the data is uncorrectable and signal, by the data source unit, a low severity error indication.

In Example 13, the subject matter of any of Examples 1-12 can optionally: 1) receive the data and the qualifier by at least one intermediate functional unit in the processing device; 2) detect, by the at least one intermediate functional unit, the data is uncorrectable based on the qualifier; and 3) transmit, without using, by the at least one intermediate functional unit, the data and the qualifier synchronously with the data to the data consumer unit.

In Example 14, the subject matter of any of Examples 1-13 can optionally at least one of signal or log, by the at least one intermediate functional unit, a low severity error indication in response to detecting the data is uncorrectable.

In Example 15, the subject matter of any of Examples 1-14 can optionally at least one of signal or log, by the data consumer unit, a high severity error indication in response to detecting the data is uncorrectable.

In Example 16, the subject matter of any of Examples 11-15 can optionally at least one of signal or log, by the data consumer unit, a low severity error indication in response to detecting the data is uncorrectable, but is not yet required for use as an operand for operand data or for execution for instruction data.

In Example 17, in the subject matter of any of Examples 11-15 the qualifier can optionally be interpreted as expanding beyond an initial data segment to an error detection granularity of a functional unit storing the data.

Example 18 is a processing device, comprising: a data source unit to transmit data and a qualifier synchronously with the data, the qualifier to indicate the data is uncorrectable and a data consumer unit to: 1) receive the data and the qualifier, detect the data is uncorrectable based on the qualifier, and maintain, without using, the data and the qualifier.

In Example 19, the processing device further comprises at least one intermediate functional unit to: 1) receive the data and the qualifier; 2) detect the data is uncorrectable based on the qualifier; and 3) transmit, without using, the data and the qualifier synchronously with the data to the data consumer unit.

In Example 20, in the subject matter of any one of Examples 18-19, the qualifier can optionally be stored in a field associated with the data.

In Example 21, in the subject matter of any one of Examples 18-20, the qualifier can optionally indicate the data source unit as a source of generating uncorrectable data.

In Example 22, in the subject matter of any one of Examples 18-21, the qualifier can optionally indicate a type of error in the data.

In Example 23, in the subject matter of any one of Examples 18-22, at least one of the data source unit, the data consumer unit, and the at least one intermediate functional unit can optionally be one of a data storage element or a data processing element.

In Example 24, in the subject matter of any one of Examples 18-23, the data storage element or the data processing element can optionally be one of a processor core, an input-output element, a memory, or an inter-processor interconnect element.

Example 25 is a non-transitory, computer-readable storage medium including instructions that, when executed by a processor, cause the processor to perform the method of Examples 1-17.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
    receiving, by a data consumer unit in a processing device, data and a qualifier synchronously with the data, the qualifier to indicate the data is uncorrectable, the data and the qualifier being received from a data source unit in the processing device;
    detecting, by the data consumer unit, the data is uncorrectable based on the qualifier;
    signaling or logging, by the data consumer unit, a high severity error indication in response to detecting the data is uncorrectable; and
    maintaining, without consuming, by the data consumer unit, the data.

2. The method of claim 1, wherein the qualifier is stored in a field associated with the data.

3. The method of claim 1, wherein the qualifier indicates the data source unit as a source of error for the data.

4. The method of claim 1, wherein the qualifier indicates a type of error in the data.

5. The method of claim 4, wherein the type of error in the data is uncorrectable or incomplete.

6. The method of claim 5, wherein the type of uncorrectable error is a multi-bit error or parity error.

7. The method of claim 1, wherein preventing use of the data and the qualifier comprises aborting delivery of the data.

8. The method of claim 1, wherein the data consumer unit is a register file or functional unit when the data comprises operand data or an execution unit when the data comprises instructions.

9. The method of claim 8,
    wherein when the data is operand data, the use of the data is prevented until the instruction stream is re-steered to error processing code and
    wherein when the data comprises instructions, the execution unit:
        detects an error based on the qualifier,
        prevents the uncorrectable instruction data from executing,
        re-steers the instructions to error processing code, and
        retires an associated instruction stream.

10. The method of claim 9, further comprising processing, by the processing device, the re-steered instruction stream with the error processing code.

11. The method of claim 9, further comprising, after processing the error processing code, resuming program execution by the processing device.

12. The method of claim 1, further comprising detecting, by the data source unit, the data is uncorrectable and signaling, by the data source unit, a low severity error indication.

13. The method of claim 1, further comprising:
    receiving the data and the qualifier by at least one intermediate functional unit in the processing device;
    detecting, by the at least one intermediate functional unit, the data is uncorrectable based on the qualifier; and
    transmitting, without using, by the at least one intermediate functional unit, the data and the qualifier synchronously with the data to the data consumer unit.

14. The method of claim 1, further comprising at least one of signaling or logging, by the at least one intermediate functional unit, a low severity error indication in response to detecting the data is uncorrectable.

15. The method of claim 1, further comprising at least one of signaling or logging, by the data consumer unit, a low severity error indication in response to detecting the data is uncorrectable, but is not yet required for use as an operand for operand data or for execution for instruction data.

16. The method of claim 1, wherein the qualifier is interpreted as expanding beyond an initial data segment to an error detection granularity of a functional unit storing the data.

17. A processing device, comprising:
    a data consumer unit to:
        receive data and a qualifier synchronously with the data, the qualifier to indicate the data is uncorrectable, the data and the qualifier being received from a data source unit in the processing device,
        receive the data and the qualifier,
        detect the data is uncorrectable based on the qualifier,
        signal or log, by the data consumer unit, a high severity error indication in response to detecting the data is uncorrectable, and
        maintain, without consuming, the data.

18. The processing device of claim 17, further comprising at least one intermediate functional unit to:
    receive the data and the qualifier;
    detect the data is uncorrectable based on the qualifier; and
    transmit, without using, the data and the qualifier synchronously with the data to the data consumer unit.

19. The processing device of claim 17, wherein the qualifier is stored in a field associated with the data.

20. The processing device of claim 17, wherein the qualifier indicates the data source unit as a source of generating uncorrectable data.

21. The processing device of claim 17, wherein the qualifier indicates a type of error in the data.

22. The processing device of claim 18, wherein at least one of the data source unit, the data consumer unit, and the at least one intermediate functional unit is one of a data storage element or a data processing element.

23. The processing device of claim 22, wherein the data storage element or the data processing element is one of a processor core, an input-output element, a memory, or an inter-processor interconnect element.

24. A non-transitory, computer-readable storage medium including instructions that, when executed by a processor, cause the processor to perform operations comprising:
   receiving, by a data consumer unit in the processor, data and a qualifier synchronously with the data, the qualifier to indicate the data is uncorrectable, the data and the qualifier being received from a data source unit in the processor;
   detecting, by the data consumer unit, the data is uncorrectable based on the qualifier;
   signaling or logging, by the data consumer unit, a high severity error indication in response to detecting the data is uncorrectable; and
   maintaining, without consuming, by the data consumer unit, the data.

25. The storage medium of claim 24, wherein the processor is further to perform operations comprising:
   receiving the data and the qualifier by at least one intermediate functional unit in the processor;
   detecting, by the at least one intermediate functional unit, the data is uncorrectable based on the qualifier; and
   transmitting, without using, by the at least one intermediate functional unit, the data and the qualifier synchronously with the data to the data consumer unit.

* * * * *